United States Patent [19]

Hartman

[11] Patent Number: 4,982,404
[45] Date of Patent: Jan. 1, 1991

[54] METHOD AND APPARATUS FOR INSURING OPERATION OF A MULTIPLE PART SYSTEM CONTROLLER

[75] Inventor: John L. Hartman, Minneapolis, Minn.

[73] Assignee: American Standard Inc., New York, N.Y.

[21] Appl. No.: 256,819

[22] Filed: Oct. 12, 1988

[51] Int. Cl.$^5$ .............................. G06F 11/30
[52] U.S. Cl. ..................... 371/62; 371/16.3; 371/61; 364/200; 364/267; 364/267.4; 364/267.9
[58] Field of Search ............ 371/12, 16.3, 61, 62, 371/66; 364/200, 900

[56] References Cited

U.S. PATENT DOCUMENTS

| | | | |
|---|---|---|---|
| 3,723,975 | 3/1973 | Kurtz, Sr. et al. | 340/172.5 |
| 4,363,092 | 12/1982 | Abo et al. | 364/200 |
| 4,403,302 | 9/1983 | Young et al. | 364/900 |
| 4,410,938 | 10/1983 | Higashiyama | 371/62 |
| 4,410,991 | 10/1983 | Lenart | 371/66 |
| 4,414,623 | 11/1983 | Davis et al. | 364/200 |
| 4,512,019 | 4/1985 | Bodig et al. | 371/12 |
| 4,513,417 | 4/1985 | Lamb et al. | 371/12 |
| 4,538,273 | 8/1985 | Lasser | 371/62 |
| 4,586,179 | 4/1986 | Sirazi et al. | 371/12 |
| 4,594,685 | 6/1986 | Owens | 364/900 |
| 4,618,953 | 10/1986 | Daniels et al. | 371/12 |
| 4,627,060 | 12/1986 | Huang et al. | 371/62 |
| 4,654,821 | 3/1987 | Lapp | 371/12 |
| 4,696,002 | 9/1987 | Schleuper et al. | 371/66 |
| 4,710,928 | 12/1987 | Ueda | 371/16 |
| 4,716,406 | 12/1987 | Shionoya | 340/814 |
| 4,727,549 | 2/1988 | Tulpule et al. | 371/62 |
| 4,752,930 | 6/1988 | Kitamura et al. | 371/12 |
| 4,775,957 | 10/1988 | Yakuwa et al. | 364/900 |
| 4,803,682 | 2/1989 | Hara et al. | 371/12 |
| 4,809,280 | 2/1989 | Shonaka | 371/62 |
| 4,811,200 | 3/1989 | Wagner et al. | 371/62 |
| 4,879,647 | 11/1989 | Yazawa | 371/62 |
| 4,896,321 | 1/1990 | Kawahara | 371/16.3 |

Primary Examiner—Allen R. MacDonald
Assistant Examiner—Debra A. Chun
Attorney, Agent, or Firm—William J. Beres; William O'Driscoll; David M. Polsley

[57] ABSTRACT

In a system controller having multiple parts including a microprocessor, a main program for execution upon the microprocessor, and at least one clock interrupt handler portion, a method and apparatus for insuring proper operation comprised of providing a main counter and a delay counter in the main program providing a hardware watching timer, and providing in the clock interrupt handler means for starting the hardware watchdog timer and decrementing the main counter of the main program. The hardware watchdog timer reinitializes the main program in the event that the main program fails to respond to the clock interrupt handler and the delay counter reinitializes the main program and the clock interrupt handler in the event that the watchdog timer fails to operate. Therefore, each of the multiple parts of the system controller serve to insure the functionality of the other parts.

12 Claims, 4 Drawing Sheets

METHOD AND APPARATUS FOR INSURING OPERATION OF A MULTIPLE PART SYSTEM CONTROLLER

TECHNICAL FIELD

This invention generally pertains to microprocessor operated system controllers and specifically to microprocessor operated system controllers having main program software and at least one clock interrupt handler operating at specific intervals.

BACKGROUND ART

A typical microprocessor operated system controller includes a microprocessor for executing a main program comprised of an instruction code, a read only memory (ROM) for storing the program, a series of random access memory registers (RAM) for use by the microprocessor during the execution of the program, and an input/output interface for providing information to the microprocessor and control signals from the microprocessor to the working loads acted upon by the system controller.

One of the advantages of the typical microprocessor operated system controller lies in its ability to respond to real time changes in the working loads controlled by the system controller. However, because of this real time response, it is desirable and in many cases necessary to insure proper ongoing operation of the system controller to prevent costly and potentially hazardous failures of the systems controlled. For example, it is often desirable to link microprocessor operated system controllers for air conditioning systems to centralized building control systems for minimizing or preventing the spread of fire in a building. Measures have been taken in prior art microprocessor lockup due to an electrical system disturbance or controller component failure. These measures have typically included the provision of an external timer to periodically reinitialize the microprocessor and restart the main program or to provide multiple timers activated by separate portions of the main program whereby the failure of the microprocessor to execute one or more of the software units would permit a timer to expire and reinitialize the microprocessor.

These systems have the disadvantage of providing single point control, i.e. providing control of the reinitialization process from a single point. For example, microprocessor controls having a single hardware watchdog timer will not be properly initialized in the event of the failure of the hardware timer. Conversely, units having timers dependent upon proper software operation in the microprocessor will not properly reinitialize in the event of a failure in the microprocessor which causes the timer restart signals to be sent continuously or in the event of a failure of the clock driving the timers. Providing redundancy in such a system to prevent the foregoing failures becomes prohibitively expensive and, as the number of components is increased to account for these 0 potential failures, increasingly subject to failure simply due to the additional number of components in the system.

Therefore, it is an object of the present invention to provide a method of insuring proper operation of a microprocessor operated system controller which is simple and reliable.

It is a further object of the present invention to provide such a method which minimizes the required number of components to properly perform its function.

It is yet a further object of the present invention to provide such a method which is cost effective and susceptible to use in mass produced system controllers.

It is still a further object of the present invention to provide such a method of operating a system controller to insure the functionality of the various parts-of the system controller.

These and other objects of the invention will be apparent from the attached drawings and the description of the preferred embodiment that follows hereinbelow.

SUMMARY OF THE INVENTION

The subject invention is a method of insuring proper operation of a microprocessor based system controller having a main program comprised of a main instruction set, a main counter and a delay counter, a hardware based watchdog timer, and at least one clock interrupt handler for decrementing the main counter and starting the watchdog timer. The main program initializes the main timer to a specified value, and upon completion of its main system instruction set begins incrementing the delay timer to a specified interval. The clock interrupt handler continues restarting the watchdog timer and decrementing the main counter to zero. In the event of the failure of the main program to restart when the main counter equals zero, the watchdog timer will reinitialize the system, conversely, in the event of the failure of the clock interrupt handler or of the hardware watchdog timer, the delay counter will reinitialize the main program, clock interrupt handler, and watchdog timer.

DESCRIPTION OF THE PREFERRED EMBODIMENT

Figure 1:
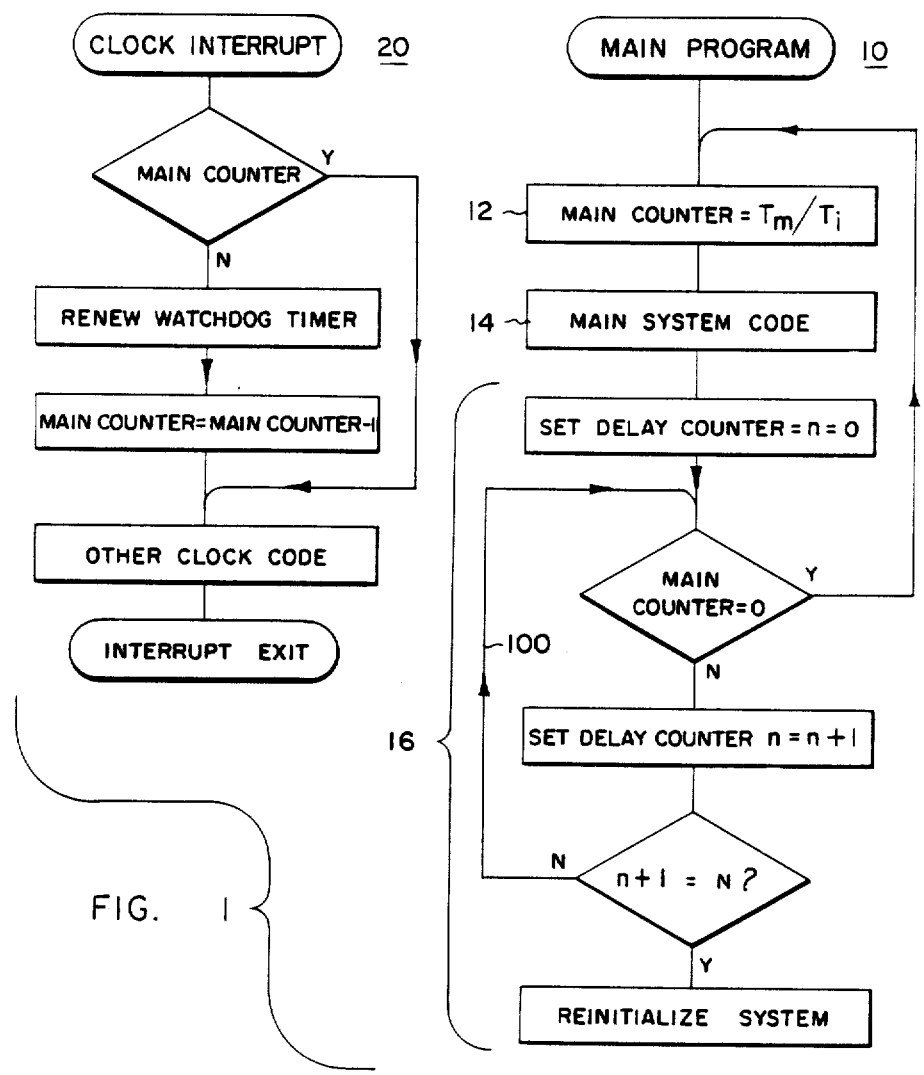
FIG. 1 shows a diagrammatic flow chart of the method of the subject invention.

The method of reinitializing a multiple part system controller according to the subject invention is generally shown in flow chart representation in FIG. 1. The method includes a main program 10 having a main counter 12, a main system code or instruction set 14 and a delay counter portion 16. A clock interrupt handler subroutine or program 20 is also disclosed for concurrent operation with the main program 10.

Figure 2:
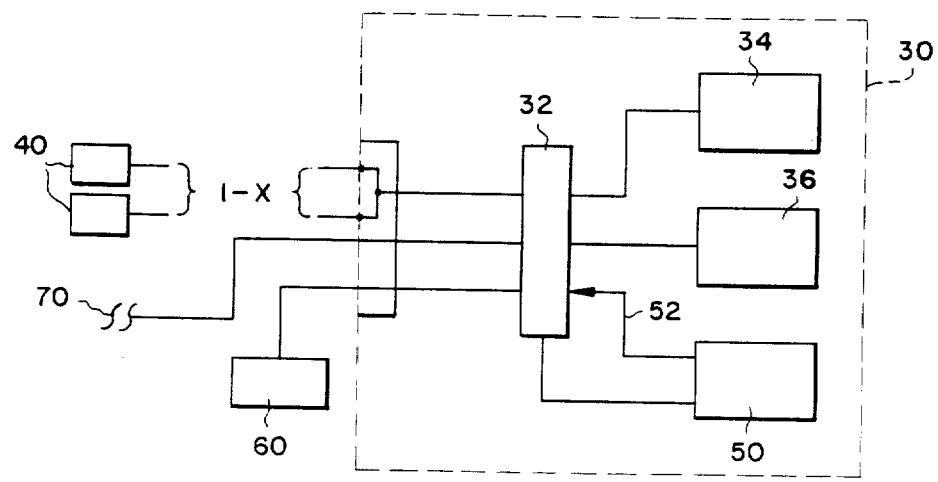
FIG. 2 shows a representative apparatus suitable for application of the subject invention.
Figure 3:
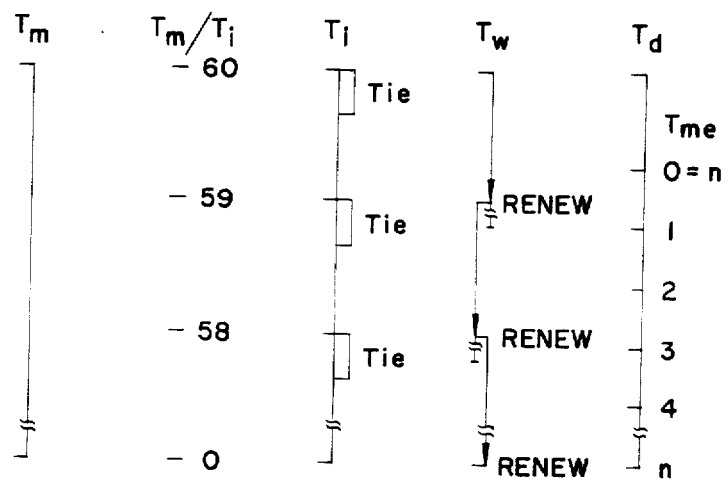
FIG. 3 shows a schematic of the normal operation of the method of the subject invention.

A block diagram of a suitable apparatus upon which the method of the subject invention may be practiced is shown in FIG. 2. A multiple part system controller 30 is shown including a microprocessor 32 accessing a ROM memory 34 and a RAM memory 36. The microprocessor 32 receives data and transmits control signals through an input/output interface 38 from and to a plurality (1 to X, depending upon the application of the apparatus) of data inputs or sensors and loads 40.

Preferably, the apparatus upon which the invention is practiced includes a single-chip microprocessor 32, such as a Mitsubishi M50747. The system controller 30 further includes a hardware watchdog timer 50 which has a "reset" output 52 and a "start" input connection 54 connected to the microprocessor 32. The clock interrupt generator 60 generates and transmits to the microprocessor 32 interrupt signals at specified intervals through an interrupt connection 62.

It is anticipated that the method of the subject invention as well as the apparatus generally disclosed in FIG. 2 would be most suitable for operations of systems requiring real-time response, such as heating, ventilating, and air conditioning systems controlled by microprocessor-operated system controllers.

In such applications, the system controller 30 would be in control of a "node" or subsystem of such an air conditioning system for sensing and controlling the heating, cooling and air flow rates through, for example, an air handler. It is believed that such systems are well understood by those skilled in the air conditioning art and need not be described in detail. Furthermore, it will also be readily apparent to those skilled in the art of electronic controls that the subject invention has fairly broad application and would be equally useful in a diverse range of applications.

FIGS. 3 through 6 disclose the operation of an apparatus according to the method of the subject invention both in normal operation and under the influence of various failures of software or hardware in the system controller 30 exemplifying the subject invention. Particular reference should be had to FIG. 1 in connection with the following description when referring to FIGS. 3 through 6. FIGS. 3 through 6 are not to scale, but rather are schematic representations of the interaction of the multiple parts of the subject invention under various operating conditions.

In normal operation, the microprocessor 32 is initialized internally when power is provided by a power supply (not shown)to the system controller 30, or when an appropriate signal is received from the zone controller 70. According to FIGS. 1 and 3, the microprocessor 32 undertakes execution of the main program 10, which is the operating software, with an interval of execution Tme. The main counter 12 is set to the desired value and the microprocessor 32 executes the main system code 14. Upon completing execution of the main system code 14, the microprocessor 32 executes a delay counter portion 16, setting a delay counter value n and proceeding with a decision iteration 100 for a specified number of interations N. The decision iteration 100 includes the steps of: (1) determining whether the main counter value is equal to zero; (2) if not, incrementing the delay counter to a new value n=n+1; and (3) determining whether the new delay counter value n now equals N. Until the delay counter value n equals the specified number of iterations N, the decision iteration 100 will continue to increment the delay counter value n. When the delay counter value n does equal the value N, the delay counter causes the main program to reinitialize the system controller 30. Alternatively, when the delay counter determines that the main counter value equals zero, the main program will branch from the delay counter subroutine, reset the main counter 12 to the selected value and continue with execution of the main code 14.

Simultaneous with the execution of the main program 10, the clock interrupt generator 60 will transmit signals at specified intervals to the microprocessor 32 and the subroutine for the clock interrupt handler 20 will execute. This subroutine involves determining whether the main counter value equals zero and is not renewing the watchdog timer 50 and decrementing the main counter value to a new value equal to the main counter value minus one. The clock interrupt handler 20 then executes the remaining clock code in the interrupt handler 20 and exits the subroutine to await the next interrupt signal from the clock interrupt generator 60.

Therefore, the main program 10 will normally execute at an interval Tm and the clock interrupt handler 20 will normally execute at an interval Ti. Preferably, Ti is substantially less than Tm, and the main counter value will be equal to the value obtained by dividing Tm by Ti. The watchdog timer 50 has an interval Tw which is less than the main program 10 interval Tm and also greater than the interval Ti of the interrupt handler 20. The delay counter 16 has an interval Td comprised of a value N, selected such that the time required to execute the main system code 14, which is an interval Tme, plus N times the number of iterations of the decision iteration 100 will exceed the interval Tm. The interval Tme is dependent upon the processing speed of the selected microprocessor 32 and the number of instructions which must be executed in the main program code 14.

As the main program 10 executes, the main counter 12 will be decremented at the desired interval Ti by the interrupt handler 20 so that the value of the main counter 12 will equal zero at the same time as the main program 10 interval Tm expires. The watchdog timer 50, having been renewed by the clock interrupt handler 20 at each execution of the interrupt handler 20 will not have sufficient time to expire prior to each renewal. Similarly, the delay counter value n will not have reached the value N before the main counter 12 is reset by the main program 10 as it starts its next execution interval Tm.

Figure 4:
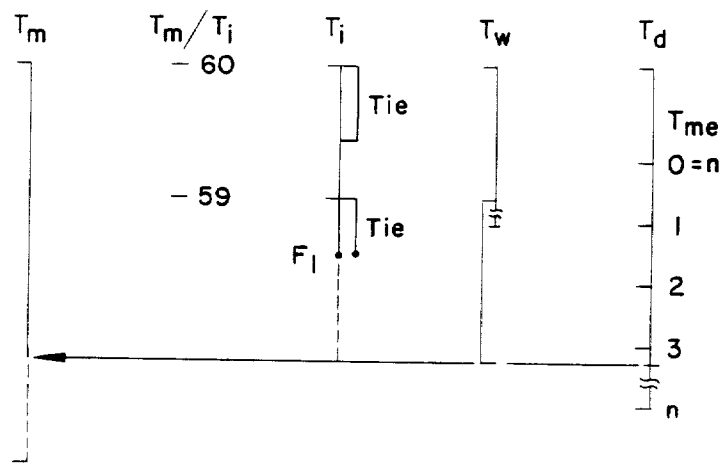
FIG. 4 shows a schematic of the method of the subject invention during the failure of the clock handler interrupt.
Figure 5:
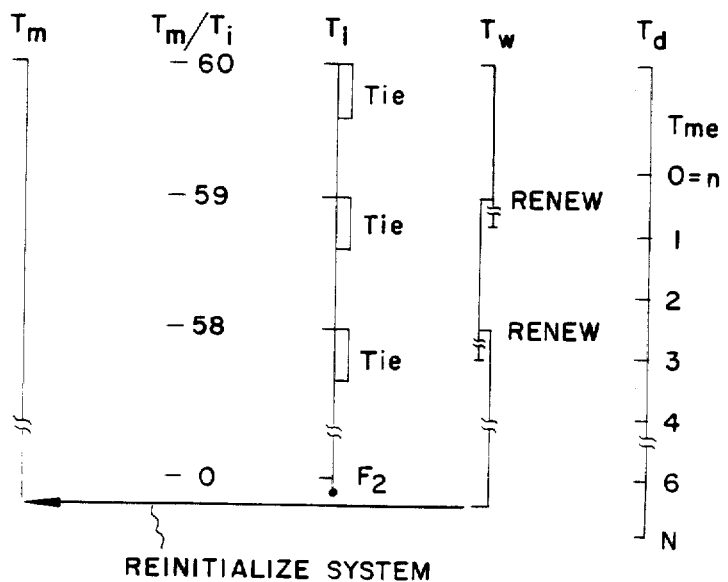
FIG. 5 shows a schematic of the method of the subject invention in a main program lockup-condition.
Figure 6:
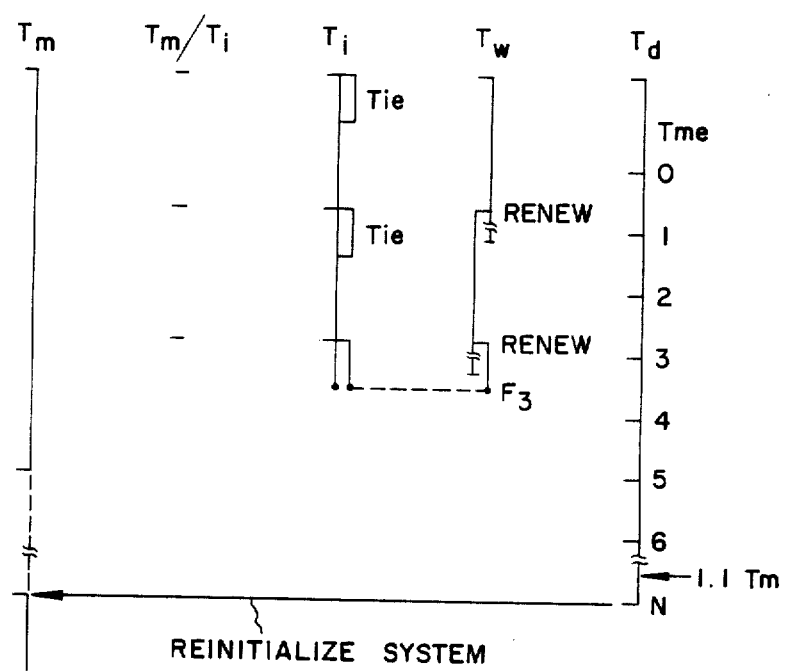
FIG. 6 shows a schematic of the method of the subject invention in the watchdog timer failure condition.

FIG. 4 exemplifies the operation of the subject invention in the event of a failure of the clock interrupt handler 20 to execute properly, or of the clock interrupt generator 60 to timely transmit the interrupt signal. The failure point is indicated as an arbitrary point F1, which may occur at any time during the interval Tm. Since the first action of the clock interrupt handler 20 would normally be renewing the watchdog timer 50, a failure of the clock interrupt handler 20 will also result in non-renewal of the watchdog timer 50. If the failure continues, the interval Tw of the watchdog timer 50 will expire to zero, whereupon the watchdog timer 50 will reinitialize the system controller 30, restarting the main program 10 and the clock interrupt handler 20.

Another type of failure commonly encountered is the lock-up or failure of the microprocessor 32 to continue to process the system code or software instructions stored in the ROM 34 after execution of the code is initiated. This failure, represented in FIG. 5 as occuring at arbitrary point F2, can be the result of electrical "noise", disturbances in the electrical supply, radio frequency interference, electromagnetic interference, or simply the misinterpretation of an instruction in the code causing the microprocessor to be unable to proceed in execution of the main program 10. This type of failure can occur during either before or after the main counter value has reached zero.

When the processing failure occurs before the main counter value reaches zero, the clock interrupt will continue to decrement the main counter value until that value equals zero. The clock interrupt handler 20 will cease renewing the watchdog timer 50 if the main counter value equals zero, or after the clock interrupt handler 20 has decremented the main counter value to zero. When the watchdog timer 50 is no longer renewed, it will continue until the expiration of the interval Tw expires and equals zero, at which time the watchdog timer 50 will reinitialize the system. If the aforementioned processing failure also prevents operation of the clock interrupt handler 20, this will also prevent the renewal of the watchdog timer 50 and result in reinitialization of the system controller 30.

Alternatively, a failure may occur in the hardware components, for example, in the watchdog timer 50 and the clock interrupt generator 60, or in the connections between these components and the microprocessor 32. In the instance of this type of failure, the microprocessor 32 would not be restarted as the main counter value decrements to zero, because the clock interrupt handler 20 is not functioning to decrement the main counter value. Nor would the microprocessor be restarted by the expiration of the watchdog timer 50, since it would not be operative to provide the reinitialization signal. However, the delay counter will increment the decision iteration 100 uninterruptedly to the N value and the main program 10 will then reinitialize the system controller 30 to resume normal operation. The operation of the subject invention in the system controller 30 is this instance is exemplified in FIG. 6, with failure occuring at the arbitrary point designated F3.

Should the hardware failure be permanent, the microprocessor will continue to operate the system controller 30 according to the instructions of the main program code 14, but will not execute the clock interrupt handler 20. The reinitialization of the system controller 30 will occur each time due to the action of the delay counter 16. The main program could also include a subroutine to signal the zone controller 70 of the partial failure of the system controller's components, providing an additional measure of protection and redundancy.

In the preferred embodiment, as applied to the system controller 30, the interval Tm is one second, the interval Tw is 0.25 seconds, and the interval Ti is 0.0166 or 1/60th second. Thus, the preferred value for Tm/Ti is 60. The interval Tw may be selected in the range of 0.2 seconds to 0.33 seconds. Ti may be selected in the range of 0.0125 seconds to 0.025 seconds, and Tm may also be changed as desired, since it is the relative duration of the intervals which is important. Also, the interval Tie required for the actual execution of the clock interrupt handler 20 may be less than the interval Ti at which the interrupt handler 20 is executed. It is also desirable to increment the delay counter 16 to a value N which will cause the time interval for execution of the main program code 14 plus the delay counter interval to slightly exceed the interval Tm. The preferred interval of Tme plus Td is 1.1 times Tm, within the range of 1.05 times Tm to 1.25 times Tm. Therefore, the interval Tme plus N iterations of the decision iteration 100 must equal 1.1Tm. The interval Tme is preferably in the range of 0.33 seconds to 0.5 seconds. The time required to perform one iteration of the decision iteration 100 will be within the range of 15 to 25 nanoseconds, depending upon the particular processor chosen. Those skilled in the art will be easily able to determine the value N best suited for a particular application of the subject invention.

As will be readily apparent to those skilled in the relevant art, the method and apparatus of the subject invention may be readily extended to systems having multiple interrupt handlers 20. The addition of each interrupt handler 20 provides additional redundancy to the system controller 30. Furthermore, it will be apparent that the subject invention requires only very minimal hardware, and that the subject invention is cost effective and reliable. The subject invention is readily implemented by the inclusion of appropriate code in the main program 10 and in the clock interrupt handler 20, which is maintained in the ROM 34. It is also readily apparent that the method of the subject invention is easily applied to any microprocessor-operated system having multiple inputs and outputs requiring real-time response and redundancy in operation. It will be appreciated, therefore, that the subject invention provides substantial advantages over the known prior art.

Modifications to the preferred embodiment of the subject invention will be apparent to those skilled in the art within the scope of the claims that follow hereinbelow.

What is claimed is:

1. A method of reinitializing a multiple part apparatus comprised of:

executing a main program for controlling said multiple part apparatus, said main program having a main program code portion and a subsequent delay counter portion, said main program further requiring an interval Tm for said execution;

starting a watchdog timer having an interval of duration Tw, said interval Tw being less than the interval Tm;

repeatedly initiating execution of an interrupt handler program upon the expiration of an interval of duration Ti, said interval Ti being less than said interval Tw;

setting a main counter to a main counter value Tm/Ti upon execution of the program code portion of said main program;

executing said delay counter portion of said main program by incrementing a delay counter value;

decrementing said main counter value and restarting said watchdog timer upon execution of said interrupt handler program when the main counter value is greater than zero;

said watchdog timer reinitializing said apparatus upon the expiration of the interval Tw; and alternatively said main program reinitializing said apparatus when the main counter value is greater than zero and the delay counter value reaches a selected value.

2. The method of reinitializing an apparatus as set forth in claim 1 wherein said interrupt handler program execution is initiated by hardware.

3. The method of reinitializing an apparatus as set forth in claim 1 wherein said main program and said interrupt handler program are software.

4. The method of reinitializing an apparatus as set forth in claim 3 wherein said apparatus includes means for processing said software.

5. The method of reinitializing an apparatus as set forth in claim 1 wherein said watchdog timer is a hardware timer.

6. A method of reinitializing a multiple part system controller comprised of:

storing a main program in a memory in said controller, said main program having a program code portion of duration Tme and a delay counter portion of duration Td;

storing an interrupt handler program in said memory;

executing in a processor in said controller the program code portion and the delay counter portion of said main program sequentially repeatedly at an interval of duration Tm, where Tm is greater than Tme and Td, the execution of the program code portion including setting a software counter function to an initial value Tm/Ti in said processor upon the initiation of the execution of said main program and the execution of the delay counter portion including the incrementing of a delay counter value;

starting a hardware timer having an interval of duration Tw, said interval Tw being less than the interval Tm, said hardware timer further including means for reinitializing said controller upon the expiration of said interval Tw;

repeatedly initiating execution of said interrupt handler program in said processor at an interval Ti with an external hardware generated signal, said interval Ti being less than the interval Tw, said interrupt handler program decrementing in each execution of the interrupt handler program the value of said software counter function and restarting said hardware timer upon execution of said interrupt handler program when the value of the software counter function is greater than zero; and reinitializing said controller alternatively when said hardware timer, and alternatively reinitializing said controller when the delay counter value of the delay counter portion of said main program increments to a selected value and the value of the software counter function is greater than zero.

7. The method of reinitializing a multiple part system controller as set forth in claim 6 wherein said delay counter portion is further comprised of program code including the steps of:

determining whether the value of the software counter function is greater than zero;

incrementing the delay counter value; and determining whether the incremented delay counter value is less than a selected value N.

8. The method of reinitializing a multiple part system controller as set forth in claim 6 wherein the duration of said interval Tm is approximately one second.

9. The method of reinitializing a multiple part system controller as set forth in claim 6 wherein the duration of said interval Tw is within the range 0.2 to 0.33 seconds.

10. The method of reinitializing a multiple part system controller as set forth in claim 6 wherein the duration of said interval Ti is within the range of 0.0125 to 0.025 seconds.

11. The method of reinitializing a multiple part system controller as set forth in claim 6 wherein the duration of said interval Tme is within the range of 0.33 to 0.5 seconds.

12. An apparatus for reinitializing a multiple part controller, said apparatus comprised of:

means for executing a main program having a program code portion and a subsequent delay counter portion, said main program further requiring an interval of duration Tm for said execution;

means for starting a hardware timer, said hardware timer decrementing to zero upon the expiration of an interval of duration Tw, said interval Tw being less than the interval Tm;

means for repeatedly initiating execution of an interrupt handler program upon the expiration of an interval of duration Ti, said interval Ti being less than said interval Tw;

means for setting a main counter to a main counter value Tm/Ti upon execution of the program code portion of said main program;

means for executing said delay counter portion of said main program including incrementing a delay counter value;

means for decrementing said main counter value and restarting said hardware timer upon execution of said interrupt handler program when the main counter value is greater than zero; and means for reinitializing said controller whereby said hardware timer reinitializes said controller upon the expiration of the interval Tw and, alternatively, said main program reinitializes said controller when the main counter value is greater than zero and the delay counter value reaches a selected value.

* * * * *

UNITED STATES PATENT AND TRADEMARK OFFICE
CERTIFICATE OF CORRECTION

PATENT NO. : 4,982,404

DATED : January 1, 1991

INVENTOR(S) : John L. Hartman

It is certified that error appears in the above-identified patent and that said Letters Patent is hereby corrected as shown below:

TITLE PAGE
In The Abstract:

Line 7, "watching" should read --watchdog--.

Column 2, Line 9, "parts-of" should read --parts of--.

Column 5, Line 22, "the-expi-" should read --the expi---.

Claim 7, Column 7, Line 44, a new paragraph should begin after the word "and".

Signed and Sealed this

Nineteenth Day of May, 1992

*Attest:*

DOUGLAS B. COMER

*Attesting Officer*  *Acting Commissioner of Patents and Trademarks*